(12) United States Patent
Wang et al.

(10) Patent No.: US 8,748,045 B2
(45) Date of Patent: Jun. 10, 2014

(54) LITHIUM BATTERY AND METHOD FOR FABRICATING THE SAME

(75) Inventors: Fu-Ming Wang, Hsinchu (TW); Chin-Shu Cheng, Hsinchu County (TW)

(73) Assignee: National Taiwan University of Science and Technology, Taipei (TW)

( * ) Notice: Subject to any disclaimer, the term of this patent is extended or adjusted under 35 U.S.C. 154(b) by 183 days.

(21) Appl. No.: 13/104,039

(22) Filed: May 10, 2011

(65) Prior Publication Data

US 2012/0214048 A1 Aug. 23, 2012

(30) Foreign Application Priority Data

Feb. 22, 2011 (TW) ............... 100105837 A

(51) Int. Cl.
*H01M 6/16* (2006.01)

(52) U.S. Cl.
USPC ....................................... 429/324

(58) Field of Classification Search
None
See application file for complete search history.

(56) References Cited

U.S. PATENT DOCUMENTS

| | | | |
|---|---|---|---|
| 2005/0095504 A1 | 5/2005 | Kim et al. | |
| 2008/0131772 A1* | 6/2008 | Jambunathan et al. | 429/199 |
| 2009/0142670 A1* | 6/2009 | Wang et al. | 429/330 |

FOREIGN PATENT DOCUMENTS

| | | |
|---|---|---|
| CN | 1757130 A | 4/2006 |
| CN | 101471456 | 7/2009 |
| CN | 101841061 A | 9/2010 |
| JP | 2000-21444 A | 1/2000 |
| JP | 2000021444 A * | 1/2000 |
| TW | 200926479 | 6/2009 |
| TW | 201001781 | 1/2010 |
| TW | 201015767 A | 4/2010 |

OTHER PUBLICATIONS

Wang et al., "Novel SEI formation of maleimide based additives and its improvement of capability and cyclicability in lithium ion batteries", Electrochimica Acta 54, 2009, pp. 3344-3351.
Wang et al., "The substituent positions effects of novel SEI formation of maleimide based additives and its rate enhancement in lithium ion battery", 15th International Meeting on Lithium Batteries, 2010, Montréal, Canada.
Wang et al., "Novel SEI formation of maleimide based additives and its improvement of capability and cyclicability in lithium ion batteries", PRiME 2008, 214th ECS Meeting, 2008, Honolulu, Hawaii, USA.
"First Office Action of China Counterpart Application", issued on Feb. 8, 2014, p. 1-p. 8.
"Office Action of Taiwan Counterpart Application", issued on Mar. 9, 2013, 2014, p. 1-p. 8.

* cited by examiner

*Primary Examiner* — Ula C Ruddock
*Assistant Examiner* — Daniel Gatewood
(74) *Attorney, Agent, or Firm* — Jianq Chyun IP Office

(57) ABSTRACT

A lithium battery and a method for fabricating the same are provided. The lithium battery includes an anode, a cathode located opposite to the anode, a separator and an electrolyte solution. The separator is located between the anode and the cathode, wherein the anode, the cathode and the separator commonly define a containing region. The electrolyte solution is located in the containing region, and includes an organic solvent, a lithium salt and an additive. The additive includes a maleimide-based compound and a hydroxyl-containing species having a molecular weight less than 1000, and a content of the hydroxyl-containing species in the electrolyte solution ranges between 0.05 wt % and 5 wt %. The lithium battery and the fabrication method thereof can solve problems of water contained in the battery, and an environment with high dryness and low moisture content is unnecessary for fabrication, thereby reducing the production cost and enhancing the battery performance.

3 Claims, 3 Drawing Sheets

LITHIUM BATTERY AND METHOD FOR FABRICATING THE SAME

CROSS-REFERENCE TO RELATED APPLICATION

This application claims the priority benefit of Taiwan application serial no. 100105837, filed Feb. 22, 2011. The entirety of the above-mentioned patent application is hereby incorporated by reference herein and made a part of this specification.

BACKGROUND

1. Field of the Invention

The invention relates to a lithium battery. Particularly, the invention relates to an electrolyte solution of a lithium battery.

2. Description of Related Art

Since a primary cell does not match a requirement of environmental protection, a secondary battery system capable of being recharged gradually draws attention in recent years. Portable electronic products such as digital cameras, mobile phones and notebook computers all require lightweight batteries. As the portable electronic devices are quickly developed and popularized, a lithium battery capable of being repeatedly charged and discharged becomes popular in the market due to its characteristics of lightweight, high voltage value and high energy density, etc. Compared with a conventional lead-acid battery, nickel-metal hydride battery, nickel-zinc battery, and nickel cadmium battery, the lithium battery has advantages of high working voltage, high energy density, lightweight, a long service life and environmental protection, etc., which is also a best choice in flexible battery application in the future. Therefore, performance requirements of the lithium battery in lightweight and durability, high voltage, high energy density and high security are increased, and the lithium battery has a high application and expansion potential in light electric vehicles, electric vehicles and large power storage industry.

However, according to the conventional technique, the lithium battery has to be fabricated in an environment of high dryness and low water content since the water can be electrolyzed into oxygen and hydrogen during electrochemical reaction of the battery, which may cause battery swelling and performance degradation. Moreover, a side reaction also takes place as high water content in the battery react with lithium salt to form hydrofluoric acid, and such outcome may cause releasing of transition metal ions of an electrode material and erosion of a collector layer, which may easily lead to a dangerous situation of the battery. Since the lithium battery has to be fabricated in the environment of high dryness and low moisture content (for example, under relative humidity<5%), most of the manufacturers have to construct drying chamber and drying plant for production and assembly to cope with the requirement of the fabrication process, so that the lithium manufacturers have to pay a high cost for electricity. On the other hand, an air chamber can be used to perform a secondary package processing procedure to ameliorate the problem of high water content in the battery. The secondary package processing procedure refers to that the plenty water contained in the battery is electrolyzed into gas during a first electrochemical reaction, and a space is preserved in the battery to guide the gas flowing into the air chamber, and then the air chamber is removed to perform the secondary package. Therefore, the fabrication steps for secondary package are complex and time-consuming. However, the aforementioned fabrication processes are all inconvenient and may increase additional fabrication cost.

SUMMARY OF THE INVENTION

Accordingly, the invention is directed to a lithium battery, which has an enhanced battery performance.

The invention is directed to a method for fabricating a lithium battery, by which the fabrication is implemented in an environment of low dryness or ordinary dryness.

The invention provides a lithium battery including an anode, a cathode, a separator and an electrolyte solution. The cathode is located opposite to the anode. The separator is located between the anode and the cathode, where the anode, the cathode and the separator commonly define a containing region. The electrolyte solution is located in the containing region, and includes an organic solvent, a lithium salt and an additive. The additive includes a maleimide-based compound and a hydroxyl-containing species, where a molecular weight of the hydroxyl-containing species is less than 1000, and a content of the hydroxyl-containing species in the electrolyte solution is between 0.05 wt % and 5 wt %.

In an embodiment of the invention, the hydroxyl-containing species is an aromatic species.

In an embodiment of the invention, the hydroxyl-containing species is at least one of compounds expressed by following formulae (2-1)-(2-4)

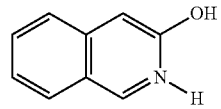

(2-1)

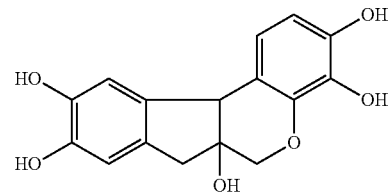

(2-2)

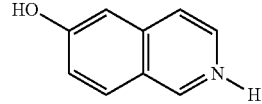

(2-3)

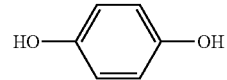

(2-4)

In an embodiment of the invention, the hydroxyl-containing species is a non-aromatic species.

In an embodiment of the invention, the hydroxyl-containing species is at least one of compounds expressed by following formulae (3-1)-(3-4):

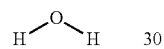

(3-1)

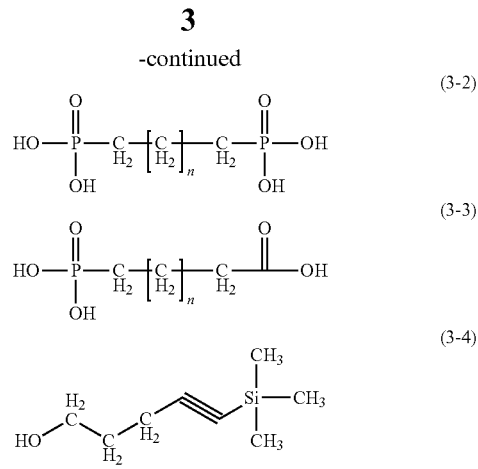

where, n in the formulae (3-2) and (3-3) respectively ranges from 0 to 30.

In an embodiment of the invention, a content of the hydroxyl-containing species represented by the formula (3-1) in the electrolyte solution ranges between about 50 ppm and 500 ppm.

In an embodiment of the invention, the maleimide-based compound is selected from the group consisting of maleimide, bismaleimide, polymaleimide, polybismaleimide, and copolymer of bismaleimide and maleimide.

In an embodiment of the invention, the additive further includes vinylene carbonate.

In an embodiment of the invention, the lithium battery further includes a package structure wrapped around the anode, the cathode, the separator and the electrolyte solution.

The invention provides a method for fabricating a lithium battery, which includes following steps. Under a dew point between −5° C. and 15° C., an anode and a cathode are separated by a separator, and a battery jelly-roll is fabricated, where the anode, the cathode and the separator commonly define a containing region. An electrolyte solution is filled in the containing region, where the electrolyte solution includes an organic solvent, a lithium salt and an additive, and the additive includes a maleimide-based compound.

In an embodiment of the invention, the step of filling the electrolyte solution in the containing region is directly performed after the battery jelly-roll is fabricated.

In an embodiment of the invention, the additive further includes a hydroxyl-containing species, and a molecular weight of the hydroxyl-containing species is less than 1000.

In an embodiment of the invention, the additive further includes vinylene carbonate.

In an embodiment of the invention, a package structure is wrapped around the anode, the cathode, the separator and the electrolyte solution.

In an embodiment of the invention, a resultant water content in the electrolyte solution ranges between about 50 ppm and 500 ppm.

According to the above descriptions, in the lithium battery of the invention, since the maleimide-based compound and the hydroxyl-containing species are contained in the mixing additive of the electrolyte solution, the mixing additive may have an electrochemical reaction to form a special substance on an electrode surface to mitigate decomposition of the electrolyte solution on the electrode surface. Therefore, loss of capacity during charge-discharge cycles of the lithium battery can be reduced thereby effectively increasing battery capacity, and the battery characteristics can thus be improved.

Moreover, the method for fabricating the lithium battery of the invention can solve conventional problems of high water content in the battery, and an environment with high dryness and low moisture content is not necessary for fabrication. In this way, the production cost is effectively reduced and the battery performance is enhanced.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
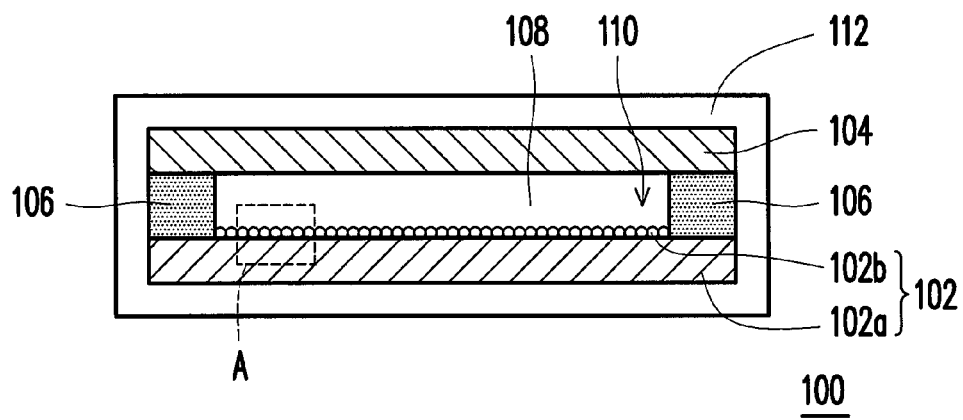
FIG. 1 is a cross-sectional view of a lithium battery according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a cross-sectional view of a lithium battery according to an embodiment of the invention. Referring to FIG. 1, a lithium battery 100 includes an anode 102, a cathode 104, a separator 106 and an electrolyte solution 108. The cathode 104 is located opposite to the anode 102, and the separator 106 is located between the anode 102 and the cathode 104. The anode 102, the cathode 104 and the separator 106 commonly define a containing region 110. The electrolyte solution 108 is located in the containing region 110. Moreover, the lithium battery 100 further includes a package structure 112. The package structure 112 can be an ordinary aluminium foil package which is used for wrapped around the anode 102, the cathode 104, the separator 106 and the electrolyte solution 108.

The anode 102 includes a copper foil 102a and an anode active material 102b, and the anode active material 102b is coated or sputtered on the copper foil 102a. The anode active material 102b can be LiAl, LiZn, $Li_3Bi$, $Li_3Cd$, $Li_3Sb$, $Li_4Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$ or combinations thereof. Meanwhile, the anode active material 102b can also be carbon powder, graphite, carbon fiber, carbon nanotubes or a mixture thereof. In an embodiment of the invention, the anode active material 102b may be the carbon powder, and a particle diameter thereof is between 5 μm and 30 μm. Besides the above materials, the anode active material 102b may further contain metal oxide, such as SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO or combinations thereof.

A material of the cathode 104 is, for example, a lithium mixed metal oxide, which can be $LiMnO_2$, $LiMn_2O_4$, $LiCoO_2$, $Li_2Cr_2O_7$, $Li_2CrO_4$, $LiNiO_2$, $LiFeO_2$, $LiNi_xCo_{1-x}O_2$, $LiFePO_4$, $LiMn_xNi_yO_2$, $LiMn_xCo_yNi_zO_2$, $LiMc_{0.5}Mn_{1.5}O_4$ or combinations thereof, where $0<x<1$, $0<y<1$, $0<z<1$, $x+y+z=1$, and Mc is a divalent metal.

Moreover, in an embodiment, the anode 102 and/or the cathode 104 may further include a polymer binder for increasing a mechanical property of the electrode. A suitable polymer binder can be polyvinylidene fluoride (PVDF), styrene-butadiene rubber (SBR), polyamide, melamine resin, or combinations thereof.

The separator 106 can be an insulation material, which is, for example, polyethylene (PE), polypropylene (PP) or a multi-layer composite structure thereof, for example PE/PP/PE.

The electrolyte solution 108 includes an organic solvent, a lithium salt and an additive, where a content of the organic solvent in the electrolyte solution 108 is between 60 wt % and 50 wt %, a content of the lithium salt in the electrolyte solution 108 is between 35 wt % and 50 wt %, and a content of the additive in the electrolyte solution 108 is between 0.05 wt % and 5 wt %. The organic solvent can be y-butyrolactone (GBL), ethylene carbonate (EC), propylene carbonate (PC), diethyl carbonate (DEC), propyl acetate (PA), dimethyl carbonate (DMC), ethylmethyl carbonate (EMC), or combinations thereof. The lithium salt can be $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiB(C_6H_5)_4$, $LiCF_3SO_3$, or combinations thereof The additive in the electrolyte solution 108 includes a maleimide-based compound, a hydroxyl-containing species and optionally vinylene carbonate, where a molecular weight of the hydroxyl-containing species is less than 1000. A content of the maleimide-based compound in the electrolyte solution 108 is, for example, between 0.05 wt % and 5 wt %, a content of the hydroxyl-containing species in the electrolyte solution 108 is, for example, between 0.05 wt % and 5 wt %, and a content of the vinylene carbonate in the electrolyte solution 108 is, for example, between 0 wt % and 2 wt %.

The maleimide-based compound of the additive can be selected from the group consisting of maleimide, bismaleimide, polymaleimide, polybismaleimide, and copolymer of bismaleimide and maleimide. The maleimide is, for example, N-phenyl maleimide, N-(o-methylphenyl)-maleimide, N-(m-methylphenyl)-maleimide, N-(p-methylphenyl)-maleimide, N-cyclohexyl maleimide, maleimide phenol, maleimide benzocyclobutene, phosphorus-containing maleimide, phosphato maleimide, siloxanyl maleimide, N-(tetrahydropyranyl-oxyphenyl)maleimide, or 2,6-dimethylphenyl maleimide. A structure of the bismaleimide is represented by a following formula (1-1):

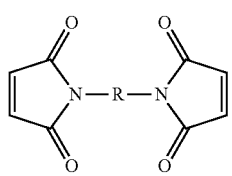

(1-1)

where, R in the above formula (1-1) can be represented as the following.

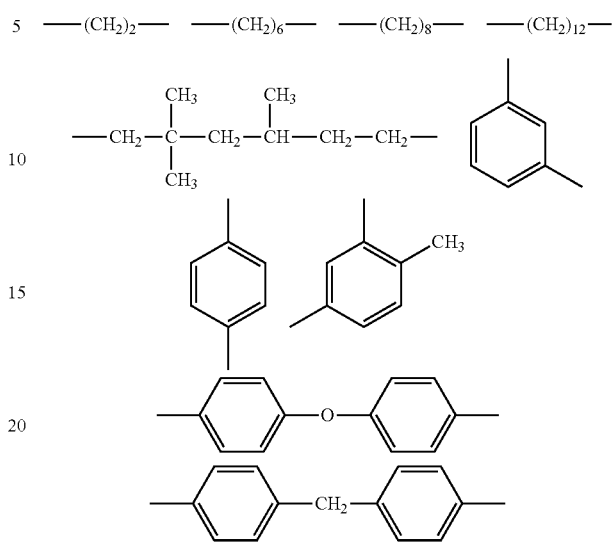

According to the above descriptions, the hydroxyl-containing species with the molecular weight less than 1000 in the additive can be an aromatic species or a non-aromatic species. In detail, when the hydroxyl-containing species is the aromatic species, the hydroxyl-containing species can be at least one of compounds expressed by following formulae (2-1)-(2-4)

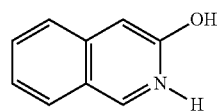

(2-1)

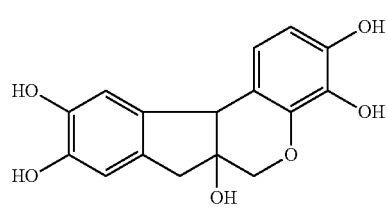

(2-2)

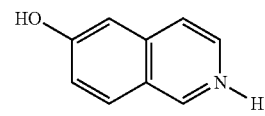

(2-3)

(2-4)

When the hydroxyl-containing species is the non-aromatic species, the hydroxyl-containing species can be at least one of compounds expressed by following formulae (3-1)-(3-4):

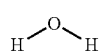

(3-1)

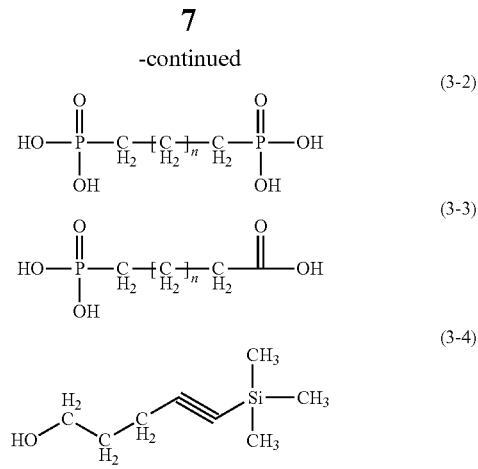

where, n in the formulae (3-2) and (3-3) respectively ranges from 0 to 30. In an embodiment, when the additive in the electrolyte solution 108 contains water represented by the formula (3-1), the resultant water content in the electrolyte solution 108 may range between 50 ppm and 500 ppm.

It should be noticed that in the invention, the maleimide-based compound is used in collaboration with the hydroxyl-containing species (for example, water or other molecules having a water-absorbable functional group) of a specific content to serve as the mixing additive of the electrolyte solution 108, which avails improving capacity and a cycle life of the lithium battery. In detail, in the additive of the electrolyte solution 108, the maleimide-based compound, the hydroxyl-containing species and the vinylene carbonate may have coupling electrochemical reactions to form a special substance on the surface of the anode, i.e. a solid electrolyte interface (SEI).

Figure 2:
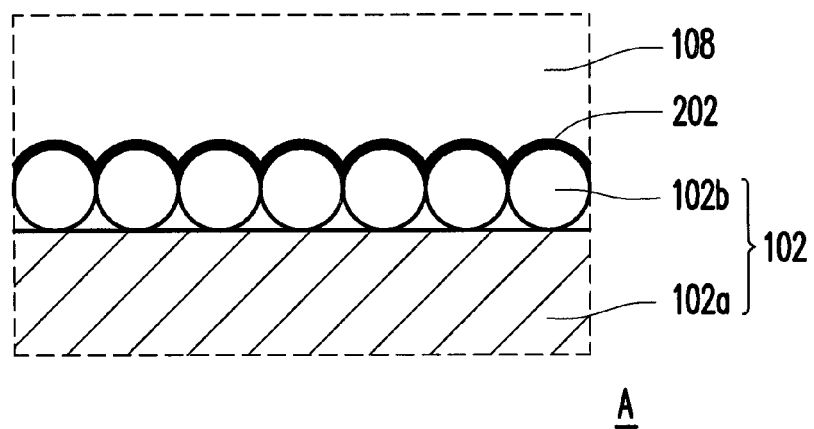
FIG. 2 is a partial enlarged diagram of a part A of FIG. 1.

FIG. 2 is a partial enlarged diagram of a part A of FIG. 1. For example, as shown in FIG. 2, since the electrochemical reactions may take place among the maleimide-based compound, the hydroxyl-containing species and the vinylene carbonate in the additive of the electrolyte solution 108, a SEI 202 is formed on the surface of the anode 102 contacting the electrolyte solution 108 (i.e. on the anode active material 102b). In this way, the SEI 202 can be used to mitigate decomposition of the electrolyte solution 108 on the surface of the anode 102, so as to improve a charge-discharge efficiency of the anode 102, and reduce irreversible loss of electric capacity of the lithium battery during the charge-discharge cycles.

Moreover, although the aromatic compound shown by the formulae (2-1) to (2-4) and the non-aromatic compound shown by the formulae (3-1) to (3-4) are taken as examples for descriptions, the invention is not limited thereto, and those skilled in the art can adjust the type and the content of the hydroxyl-containing species in the additive of the electrolyte solution 108 according to actual design requirements and process conditions as long as the molecular weight of the hydroxyl-containing species is less than 1000, and the content of the hydroxyl-containing species in the electrolyte solution 108 is between 0.05 wt % and 5 wt %, which is considered to be within a scope of the invention.

Figure 3:
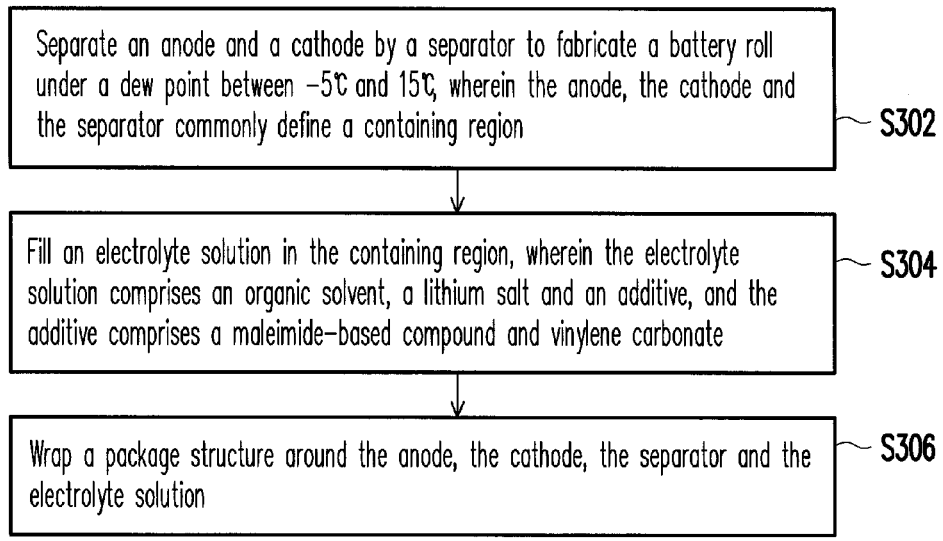
FIG. 3 is a flowchart illustrating fabrication steps of a lithium battery according to an embodiment of the invention.

A method for fabricating the lithium battery is introduced below. It should be notice that the following fabrication flow is used to introduce the method for fabricating the lithium battery in detail, which can be performed in the environment of low dryness or ordinary dryness, though it is not used to limit the invention. Materials, compositions, forming methods and forming sequences of the other components of the lithium battery can be implemented according to general techniques known by those skilled in the art, or according to the descriptions of the aforementioned embodiment, which are not limited to the following embodiment. FIG. 3 is a flowchart illustrating fabrication steps of a lithium battery according to an embodiment of the invention.

Referring to FIG. 3, in step S302, under a dew point between −5° C. and 15° C., an anode and a cathode are separated by a separator to fabricate a battery jelly-roll, where the anode, the cathode and the separator commonly define a containing region. Moreover, before the step S302, the anode and the cathode can be first fabricated. Then, in the environment of low dryness or ordinary dryness with the dew point between −5° C. and 15° C., the separator, for example, made of PP is used to separate the anode and the cathode through a winding approach to fabricate the battery jelly-roll. Relative humidity of the low-dryness or the ordinary-dryness environment is, for example, 15% to 50%. In an embodiment, the battery jelly-roll can be directly used for subsequent fabrication processes without being disposed in the atmospheric environment for a period of time. In another embodiment, the battery jelly-roll can be first disposed in the atmospheric environment for a period of time, and then is used for the subsequent fabrication processes.

In step S304, an electrolyte solution is filled in the containing region, where the electrolyte solution includes an organic solvent, a lithium salt and an additive, and the additive includes a maleimide-based compound and vinylene carbonate. The electrolyte solution can be a mixture of the organic solvent, the lithium salt and the additive, where a content of the organic solvent in the electrolyte solution is between 60 wt % and 50 wt %, a content of the lithium salt in the electrolyte solution is between 35 wt % and 50 wt %, and a content of the additive in the electrolyte solution is between 0.05 wt % and 5 wt %. Moreover, in an embodiment, the additive of the electrolyte solution filled in the containing region further includes a hydroxyl-containing species, where a molecular weight of the hydroxyl-containing species is less than 1000. It should be noticed that the type and the content of the hydroxyl-containing species can be adjusted, varied and applied according to the aforementioned embodiment, which is not repeated herein.

In step S306, a package structure is wrapped around the anode, the cathode, the separator and the electrolyte solution to complete fabrication of the lithium battery.

It should be noticed that by fabricating the lithium battery under a specific humidity condition, the water (moisture) in the environment may react with the additive in the electrolyte solution, so that the coupling electrochemical reactions take place to form the SEI on the electrode surface, so as to achieve the effect of the aforementioned embodiment that the hydroxyl-containing species is added in the additive of the electrolyte solution. Moreover, according to the conventional technique, before the lithium battery is packaged, the fabrication process has to be performed in the environment with high dryness and low moisture content. In contrast, according to the fabrication method of the present invention, the fabrication process can be performed in the environment of low dryness or ordinary dryness with the dew point between −5° C. and 15° C. Accordingly, the environment with high dryness and low moisture content is not necessary for fabrication in this invention, and a strict drying treatment is unnecessary, so that as the capacity and the battery performance of the lithium battery are improved, the fabrication cost thereof is reduced.

To proof that the lithium battery and the method for fabricating the same of the invention can indeed improve the battery performance, an experiment example is provided for description. Data results of the following experiment example are only used to describe characteristics of capacity, battery efficiency and alternating current (AC) impedance, etc. of the lithium battery fabricated according to the fabrication method of the invention, which are not used to limit the invention.

EXPERIMENT EXAMPLE $LiCoO_2$ of 90 parts by weight, polyvinylidene difluoride (PVDF) of 5 parts by weight and acetylene black (conductive powder) of 5 parts by weight are added and dispersed into N-methyl-2-pyrrolidinone (NMP), and such paste is coated on an aluminium foil for drying, compressing and cutting processes to form the cathode. Moreover, graphite of 95 parts by weight, and PVDF of 5 parts by weight are added and dispersed into the NMP, and such paste is coated on an aluminium foil for drying, compressing and cutting processes to form the anode. Then, in the environment of low dryness or ordinary dryness with the dew point between −5° C. and 15° C., PP is used as the separator to separate the anode and the cathode through a winding approach to fabricate the battery jelly-roll, and the battery jelly-roll is disposed in the ordinary humidity or high humidity (for example, under relative humidity>95%) environment for six months.

Then, propylene carbonate (PC) of 2 parts by volume, ethylene carbonate (EC) of 3 parts by volume and diethyl carbonate (DEC) of 5 parts by volume are mixed as the organic solvent of the electrolyte solution. The lithium salt of the electrolyte solution is $LiPF_6$ with a concentration of 1M. The additive of the electrolyte solution includes bismaleimide and vinylene carbonate, where the bismaleimide in this example is as that shown by formula (1-2). The content of the bismaleimide in the electrolyte solution is about 0.1 wt %, and the content of the vinylene carbonate in the electrolyte solution is about 2 wt %. Then, the above electrolyte solution is added into the containing region between the anode and the cathode. Finally, the package structure is wrapped around the above structure to complete the fabrication of the lithium battery, and the lithium battery is tested for charging and discharging under a general room temperature. In the lithium battery of this example, the resultant water content in the electrolyte solution is approximately 500 ppm.

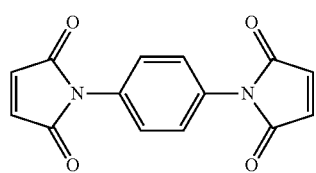

(1-2)

COMPARISON EXAMPLE $LiCoO_2$ of 90 parts by weight, PVDF of 5 parts by weight and acetylene black (conductive powder) of 5 parts by weight are added and dispersed into NMP, and such paste is coated on an aluminium foil for drying, compressing and cutting processes to form the cathode. Moreover, graphite of 95 parts by weight, and PVDF of 5 parts by weight are added and dispersed into the NMP, and such paste is coated on an aluminium foil for drying, compressing and cutting processes to form the anode. Then, in the environment of high dryness with the dew point between −25° C. and −40° C., PP is used as a separator to separate the anode and the cathode through a winding approach to fabricate the battery jelly-roll, and the battery jelly-roll is disposed in the high dryness (for example, under relative humidity<5%) environment for six months. Then, the same fabrication processes as described above are used to complete the fabrication of the lithium battery, and the lithium battery is tested for charging and discharging under the general room temperature.

In other words, in the comparison example, besides that the battery jelly-roll is fabricated in the high dryness (for example, under relative humidity<5%) environment, and is disposed in the high dryness environment for six months, the other battery fabrication steps, the types of and the contents of the organic solvent, the lithium salt, and the additive in the electrolyte solution are all the same as the aforementioned experiment example.

MEASUREMENT OF ELECTRICAL PROPERTIES

A. Battery Capacity:

The lithium batteries of the experiment example and the comparison example are charged and discharged by a constant current/voltage. First, a constant current density of 0.2 $mA/cm^2$ is used to charge the lithium batteries to a voltage of 4.2 V until the current is less than or equal to 0.1 mA. Then, the lithium batteries are discharged to a cut-off voltage (2.75 V) through the constant current density of 0.2 $mA/cm^2$. The capacity (milliamp hours (mAh)) and efficiency of the respective lithium batteries of the experiment example and the comparison example are as that shown in following Table 1.

B. Charge-Discharge Cycle Test

Figure 4:
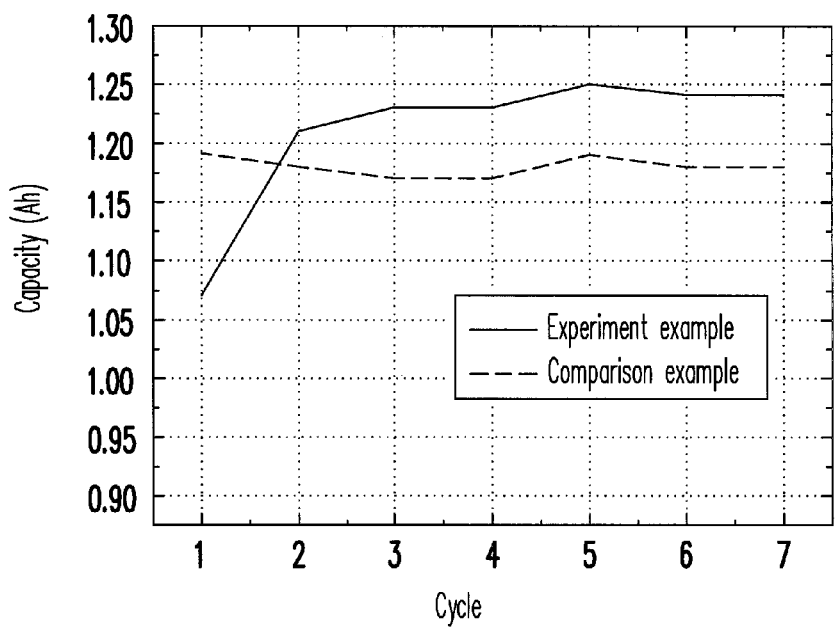
FIG. 4 is a diagram illustrating relation curves of charge-discharge cycle and capacity of lithium batteries according to an experiment example and a comparison example of the invention.

The lithium batteries of the experiment example and the comparison example are charged and discharged by a constant current/voltage. First, a constant current of 260 mA is used to charge the lithium batteries to the voltage of 4.2 V until the current is less than or equal to 2.6 mA. Then, the lithium batteries are discharged to the cut-off voltage (2.75 V) through the constant current density of 1 $mA/cm^2$, and the above process is repeated by 7 times. The capacity (milliamp hours (mAh)) of the lithium batteries of the experiment example and the comparison example are as that shown in the following Table 1. Moreover, FIG. 4 is a diagram illustrating relation curves of charge-discharge cycle and capacity of the lithium batteries according to the experiment example and the comparison example of the invention.

C. AC Impedance Experiment

After the lithium batteries of the experiment example and the comparison example are completely discharged through a constant current in the seventh cycle, an AC voltage with an amplitude of 5 mV is used to perform a diode-type AC impedance scan with a frequency range of 100K-0.01 Hz.

Figure 5:
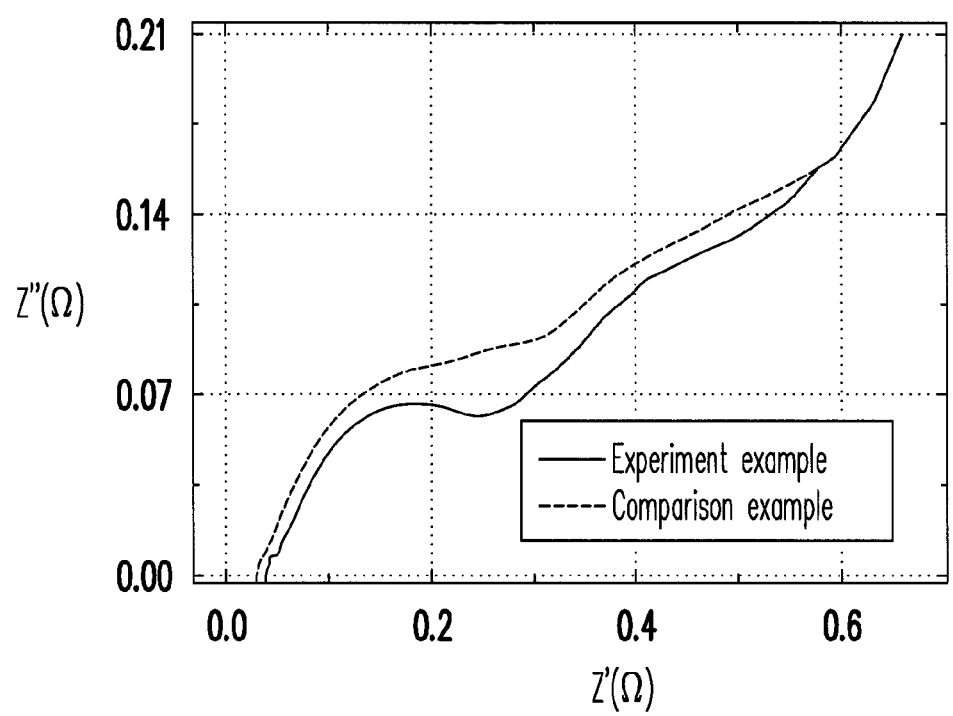
FIG. 5 is diagram illustrating AC impedance curves during a charging process of the lithium batteries according to the experiment example and the comparison example of the invention.

FIG. 5 is diagram illustrating AC impedance curves during a charging process of the lithium batteries according to the experiment example and the comparison example of the invention.

TABLE 1

| | Capacity of battery discharge in the first cycle (mAh) | Efficiency of charge-discharge in the first cycle (%) | Capacity of battery discharge in the second cycle (mAh) | Efficiency of charge-discharge in the second cycle (%) | Capacity of battery discharge in the seventh cycle (mAh) | Efficiency of charge-discharge in the seventh cycle (%) |
|---|---|---|---|---|---|---|
| Experiment example | 1068 | 93.7 | 1214 | 98.6 | 1239 | 99.5 |
| Comparison example | 1194 | 93.6 | 1180 | 97.5 | 1176 | 99.4 |

According to the Table 1, by comparing the experiment example and the comparison example, after 7 times of cycling, the capacity of the experiment example is increased by about 5%-10%. Moreover, as shown in FIG. 4, a cycle life of the lithium battery of the experiment example that is not performed with the drying treatment and is disposed in the high humidity (for example, under relative humidity>95%) environment for six months is longer than a cycle life of the lithium battery of the comparison example that is performed with the strict drying treatment and is disposed in the high dryness (for example, under relative humidity<5%) environment for a long time. Compared with the comparison example, the electric properties of the lithium battery of the experiment example is relatively poor and irreversibility of the battery reactivity is relatively large during the first cycle of battery charge-discharge process. The reasons that lead to the above results is that during the first cycle of battery charge-discharge process, the additive and the water in the electrolyte solution may have the electrochemical reaction to form the SEI on the electrode surface (shown in FIG. 2). However, after the second cycle of battery charge-discharge process, the battery capacity of the experiment example is obviously higher than the battery capacity of the comparison example. Therefore, by disposing the lithium battery of the experiment example in the environment with certain humidity, the whole battery capacity can be increased by 5%-10% through calculation.

Moreover, as shown in FIG. 5, as the lithium batteries are charged, rising magnitude of the AC impedance of the lithium battery of the experiment example is far less than that of the lithium battery of the comparison example, and the whole battery AC impedance of the lithium battery of the experiment example is lower than that of the lithium battery of the comparison example, which avails increasing the cycle life of the lithium battery of the experiment example.

According to the above data, it is known that even if the drying treatment is not performed, the lithium battery and the method for fabricating the same of the invention can still effectively improve the capacity of the lithium battery. In this way, the capacity and the efficiency of the lithium battery can be ameliorated through the electrochemical reaction of the additive in the electrolyte solution without changing any battery design and electrode material.

In summary, the lithium battery and the method for fabricating the same of the invention has at least the following advantages:
1. In the lithium battery of the aforementioned embodiment, the maleimide-based compound and the hydroxyl-containing species are contained in the mixing additive of the electrolyte solution, which can effectively improve the battery capacity and efficiency.
2. In the method for fabricating the lithium battery of the aforementioned embodiment, the lithium battery can be fabricated under a specific humidity condition, so that the water in the environment and the additive may have the electrochemical reaction, which avails improving the capacity of the lithium battery.
3. The lithium battery and the method for fabricating the same of the aforementioned embodiment can be integrated with the existing fabrication process, which has a simple fabrication process and formulation. In addition, the battery performance can be effectively improved even without applying a high-precision drying plant, so that the fabrication cost of the battery is effectively reduced, and competitiveness thereof is improved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. A lithium battery, comprising:
an anode;
a cathode, located opposite to the anode;
a separator, located between the anode and the cathode, wherein the anode, the cathode and the separator commonly define a containing region; and
an electrolyte solution, located in the containing region, and comprising an organic solvent, a lithium salt and an additive, wherein the additive comprises:
a maleimide-based compound; and
a hydroxyl-containing species, having a molecular weight less than 1000, wherein a content of the hydroxyl-containing species in the electrolyte solution is between 50 ppm and 5 wt %, and the hydroxyl-containing species is at least one of compounds expressed by following formulae (2-1)-(2-2) and (3-2)-(3-4)

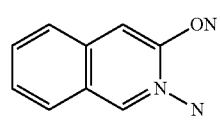

(2-1)

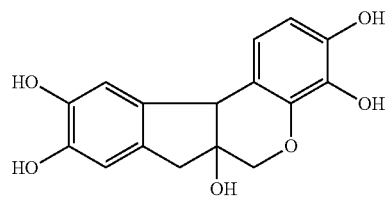

(2-2)

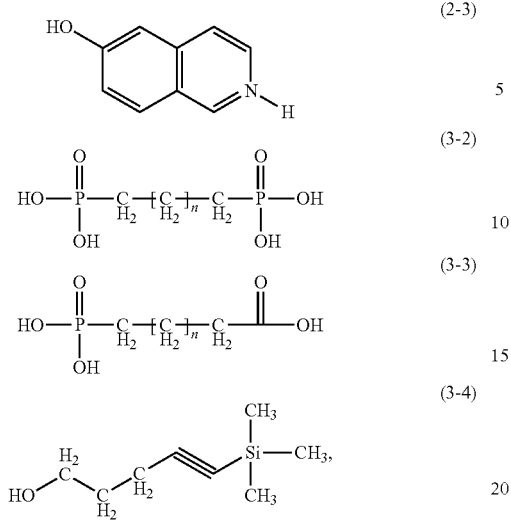

where, n in the formulae (3-2) an (3-3) respectively ranges from 0 to 30.

2. The lithium battery as claimed in claim 1, wherein the maleimide-based compound is selected from the group consisting of maleimide, bismaleimide, polymaleimide, polybismaleimide, and copolymer of bismaleimide and maleimide.

3. The lithium battery as claimed in claim 1, further comprising a package structure wrapped around the anode, the cathode, the separator and the electrolyte solution.

* * * * *